US007938945B2

(12) United States Patent
Lee et al.

(10) Patent No.: US 7,938,945 B2
(45) Date of Patent: *May 10, 2011

(54) MICROFLUIDIC DEVICE FOR ELECTROCHEMICALLY REGULATING PH OF FLUID AND METHOD OF REGULATING PH OF FLUID USING THE MICROFLUIDIC DEVICE

(75) Inventors: Hun-joo Lee, Seoul (KR); Joon-ho Kim, Seongnam-si (KR); Kyu-youn Hwang, Incheon-si (KR)

(73) Assignee: Samsung Electronics Co., Ltd. (KR)

( * ) Notice: Subject to any disclaimer, the term of this patent is extended or adjusted under 35 U.S.C. 154(b) by 1213 days.

This patent is subject to a terminal disclaimer.

(21) Appl. No.: 11/559,196

(22) Filed: Nov. 13, 2006

(65) Prior Publication Data
US 2007/0138025 A1 Jun. 21, 2007

(30) Foreign Application Priority Data

Dec. 21, 2005 (KR) .................. 10-2005-0126918

(51) Int. Cl.
*C25B 9/00* (2006.01)

(52) U.S. Cl. .................. 204/450; 204/252; 204/600

(58) Field of Classification Search .................. 204/450, 204/252, 600; 205/746
See application file for complete search history.

(56) References Cited

U.S. PATENT DOCUMENTS

| 6,706,163 | B2 * | 3/2004 | Seul et al. ................ 204/549 |
| 2005/0191620 | A1 | 9/2005 | McDevitt et al. |

FOREIGN PATENT DOCUMENTS

| EP | 1314472 | 5/2003 |
| WO | 03045557 | 6/2003 |
| WO | 2005085796 | 9/2005 |

OTHER PUBLICATIONS

European Search Report for Application No. 06124994.2-2206; Mail date May 4, 2007.
Ges et al.; "Thin-film IrOx pH microelectrode for microfluidic-based microsystems"; Biosensors and Bioelectronics vol. 21 (2005) pp. 248-256.
"Palladium-hydrogen electrodes for coulometric titration analysis of acids and bases"; Authors: Bhadra Munasiri, et al.; J. Electroanal. Chem., 332 (1992) pp. 333-337.

* cited by examiner

*Primary Examiner* — Arun S Phasge
(74) *Attorney, Agent, or Firm* — Cantor Colburn LLP

(57) ABSTRACT

A microfluidic device includes; an ion exchange membrane, an anode chamber one side of which contacts a surface of the ion exchange membrane, wherein the anode chamber further includes a ladder-shaped anode and an anode support part, and a cathode chamber, one side of which contacts a surface of the ion exchange membrane opposite the anode chamber, wherein the cathode chamber further comprises a cathode, wherein the ladder-shaped anode is formed on a first surface of the anode support part, openings are formed in the anode support part which conform to the shape of the ladder-shaped anode, and a second surface of the anode support part which opposes the first surface of the anode contacts and supports the ion exchange membrane.

19 Claims, 10 Drawing Sheets

MICROFLUIDIC DEVICE FOR ELECTROCHEMICALLY REGULATING PH OF FLUID AND METHOD OF REGULATING PH OF FLUID USING THE MICROFLUIDIC DEVICE

This application claims the priority to Korean Patent Application No. 10-2005-0126918, filed on Dec. 21, 2005, and all the benefits accruing therefrom under 35 U.S.C. §119, the contents of which in its entirety are herein incorporated by reference.

BACKGROUND OF THE INVENTION

1. Field of the Invention

The present invention relates to a microfluidic device which electrochemically regulates a pH of a fluid therein and a method of regulating the pH of the fluid in a microfluidic device.

2. Description of the Related Art

A microfluidic device includes an inlet, an outlet, a reaction chamber, and a microchannel connecting the inlet, the outlet, and the reaction chamber. The microfluidic device also includes a micropump for transferring fluids, a micromixer for mixing the fluids, a microfilter for filtering the fluids, and other additional components, in addition to the microchannel.

Microfluidic devices are well known to those of ordinary skill in the art and are used in microanalysis devices such as lab-on-a-chips ("LOCs"), which perform a series of biological analysis processes including cell enrichment, cell lysis, biomolecule refinement, nucleic acid amplification and separation, protein separation, hybridization reaction, and detection.

Each step needs a different pH in order to perform the various biological analysis processes as described above. A conventional method of regulating pH in a biological analysis process is performed by adding or removing an acid solution, a basic solution, a neutral solution or a buffer solution. However, when regulating pH, the addition or removal of such a pH-regulating solution in a microfluidic device requires a separate device and process. Also, a sample solution in the microfluidic device is undesirably diluted.

Such problems regarding the addition of a pH-regulating solution or the need for a separate device may be serious in a microfluidic device using microvolumes. In addition, the dilution can also be a problem when taking or amplifying a target sample. Moreover, when the added pH-regulating material may act as an inhibitor in a later performed biological analysis process, the added pH-regulating material should be removed to prevent unreliable results.

Electrolysis may be used as a method for solving the problems arising with the conventional method of externally injecting a pH-regulating reagent. For example, a pH can be regulated using an electrolytic device including an anode chamber, a cathode chamber, and a separation membrane between the anode and cathode chambers.

However, in the conventional method, when a solution flowing into the chambers contacts the separation membrane, the separation membrane swells, and thus changes in shape and size, thereby leading to a change in volume of the chambers. In addition, due to the small size of the electrodes, there is a large difference in resistance between the electrodes. Furthermore, an electric current flows locally through the chamber, and thus leads to a higher pH near the anode. Thus, pH cannot be uniformly regulated. In addition, pH in each of the chambers changes too slowly to enable efficient biological assays such as a cell lysis process.

BRIEF SUMMARY OF THE INVENTION

It is one aspect of the present invention to provide a microfluidic device which electrochemically regulates a pH of fluid with a high efficiency and which prevents the swelling of a chamber separation membrane.

Another aspect of the present invention provides a method which regulates a pH of fluid in a microfluidic device through electrolysis.

According to an exemplary embodiment of the present invention, a microfluidic device for electrochemically regulating a pH of a fluid, includes; an ion exchange membrane, an anode chamber, one side of which contacts a surface of the ion exchange membrane, wherein the anode chamber further includes a ladder-shaped anode and an anode support part, and a cathode chamber, one side of which contacts a surface of the ion exchange membrane opposite the anode chamber, wherein the cathode chamber further includes a cathode, wherein the ladder-shaped anode is formed on a first surface of the anode support part, openings are formed in the anode support part which conform to the shape of the ladder-shaped anode, and a second surface of the anode support part, which opposes the first surface of the anode support part, contacts and supports the ion exchange membrane.

In one exemplary embodiment the anode support part may be formed of a printed circuit board (PCB).

In one exemplary embodiment the microfluidic device may further include a pillar structure on the cathode, wherein the pillar structure contacts and supports the ion exchange membrane.

In one exemplary embodiment each of the anode and cathode chambers may further comprise a gas outlet.

In one exemplary embodiment the cathode may be formed of a metal which adsorbs hydrogen gas, and the anode may be formed of a metal which has a higher standard oxidization potential than, and which does not react with, water.

In one exemplary embodiment the cathode may be formed of palladium (Pd).

In one exemplary embodiment the anode may be formed of a material selected from the group consisting of copper (Cu), lead (Pb), silver (Ag), chromium (Cr), titanium (Ti), nickel (Ni), zinc (Zn), iron (Fe), and tin (Sn).

In one exemplary embodiment the ion exchange membrane may transmit an electric current and may substantially prevent the transmission of ions and gases therethrough.

In one exemplary embodiment each of the cathode and anode chambers may further comprise a fluid inlet and a fluid outlet.

In one exemplary embodiment each of the cathode and anode chambers may further include a micropump.

According to another exemplary embodiment of the present invention, a method of electrochemically regulating a pH of a fluid in a microfluidic device including; an ion exchange membrane, an anode chamber, one side of which contacts a surface of the ion exchange membrane, wherein the anode chamber further comprises a ladder-shaped anode and an anode support part, a cathode chamber, one side of which contacts a surface of the ion exchange membrane opposite the anode chamber, wherein the cathode chamber further comprises a cathode, wherein the ladder-shaped anode is formed on a first surface of the anode support part, openings are formed in the anode support part which conform to the shape of the ladder-shaped anode, and a second surface of the anode support part, which opposes the first surface of the anode support part, contacts and supports the ion exchange membrane, the method including; flowing a solution containing ions which have a higher or lower standard oxidization potential than water into the anode chamber, flowing a solution containing ions which have a lower standard reduction potential than water into the cathode chamber; and inducing electrolysis in each of the anode and cathode chambers by applying an electric current between the anode and cathode.

In one exemplary embodiment the ions which have a lower standard oxidization potential than water may be at least one selected from the group consisting of $NO_3^-$, $F^-$, $SO_4^{2-}$, $PO_4^{3-}$ and $CO_3^{2-}$.

In one exemplary embodiment the ions which have a higher standard oxidization potential than water may be $Cl^-$.

In one exemplary embodiment the ions which have a lower standard reduction potential than water may be at least one selected from the group consisting of $Na^+$, $K^+$, $Ca^{2+}$, $Mg^{2+}$, and $Al^{3+}$.

In one exemplary embodiment the pH may be regulated according to the direction in which an electric current is applied, the magnitude of the electric current, the duration of the application of the electric current, the width of at least one of the anode and the cathode, and the thickness of the ion exchange membrane.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
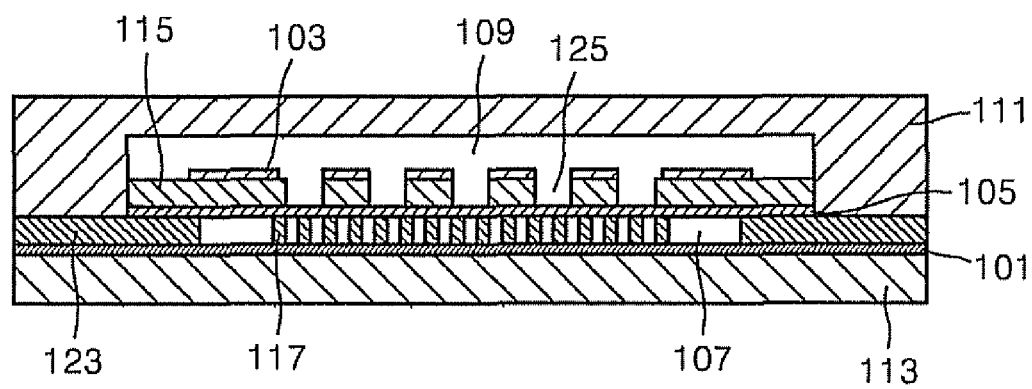
FIG. 1 is a cross-sectional view of an exemplary embodiment of a microfluidic device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described more fully with reference to the accompanying drawings.

The present invention provides a microfluidic device which electrochemically regulates a pH of a fluid.

Figure 2:
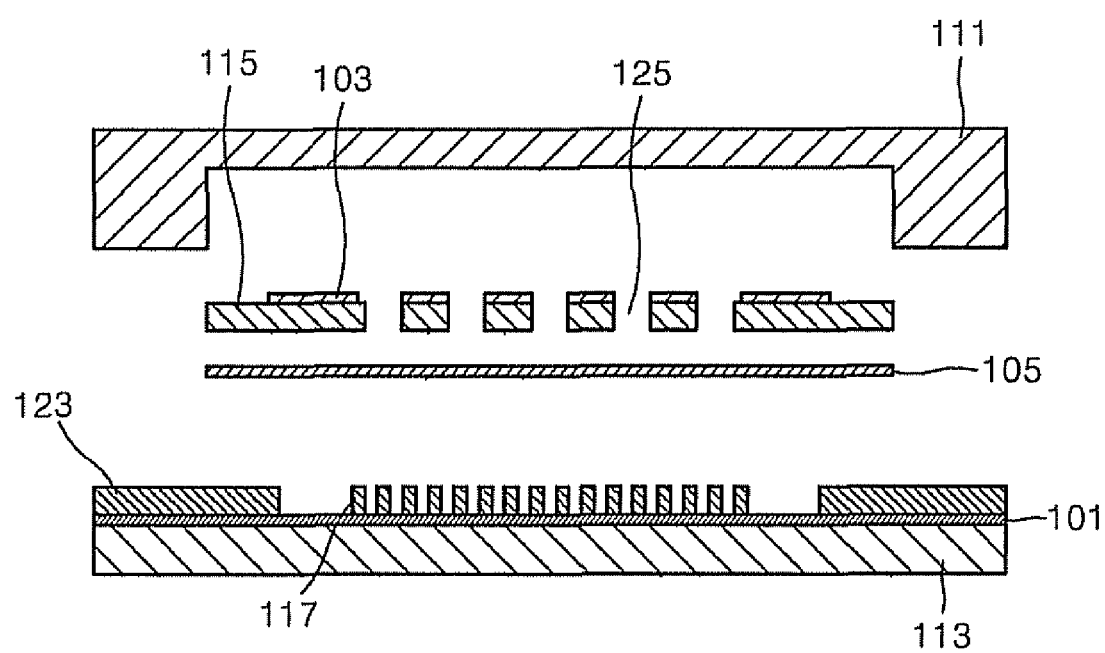
FIG. 2 is an exploded view of the exemplary embodiment of a microfluidic device of FIG. 1.

FIG. 1 is a cross-sectional view of an exemplary embodiment of a microfluidic device according to the present invention, and FIG. 2 is an exploded view of the exemplary embodiment of a microfluidic device of FIG. 1.

Referring to FIGS. 1 and 2, the microfluidic device includes: an ion exchange membrane 105; an anode chamber 109 one side of which contacts the ion exchange membrane 105 and which includes a ladder-shaped anode 103 and an anode support part 115 supporting the anode 103; and a cathode chamber 107 a side of which contacts the opposing surface of the ion exchange membrane 105 and which includes a cathode 101. The ladder-shaped anode 103 is formed on a surface of the anode support part 115, and openings 125 are formed in the anode support part 115 which conform to the shape of the ladder-shaped anode 103. The surface of the anode support part 115 which is opposite the anode 103 contacts and supports the ion exchange membrane 105.

In the exemplary embodiment of a microfluidic device according to the present invention, the anode chamber and the cathode chamber refer to spaces which can accommodate materials such as a fluid and together the anode chamber 109 and the cathode chamber 107 make up a larger opening referred to simply as the chamber. In one exemplary embodiment the chamber, the anode chamber, and the cathode chamber may be micro-chambers which can accommodate materials with a volume of a microliter or less, but are not limited thereto. Exemplary embodiments of the chamber can be selected from the group consisting of a cell lysis chamber, a nucleic acid separation/refinement chamber, a nucleic acid amplification chamber, a hybridization chamber, and a signal detection chamber. In additional exemplary embodiments the chamber can be connected to other various chambers through microchannels. Therefore, an exemplary embodiment of a microfluidic device according to the present invention can be a lab-on-a-chip ("LOC") which can electrochemically regulate the pH of a fluid containing biomolecules.

Referring to FIGS. 1 and 2, sides of the anode chambers 109 are defined by an anode chamber substrate 111, and sides of the cathode chamber 107 are defined by cathode chamber substrates 113 and 123.

In the exemplary embodiment of a microfluidic device of FIGS. 1 and 2, the anode support part 115 supports the ion exchange membrane 105 and prevents swelling of the ion exchange membrane 105, thereby minimizing a change in volume of either of the anode or cathode chambers. In addition, the ladder shape of the anode 103 facilitates current flow and enables efficient pH regulation.

Figure 3A:
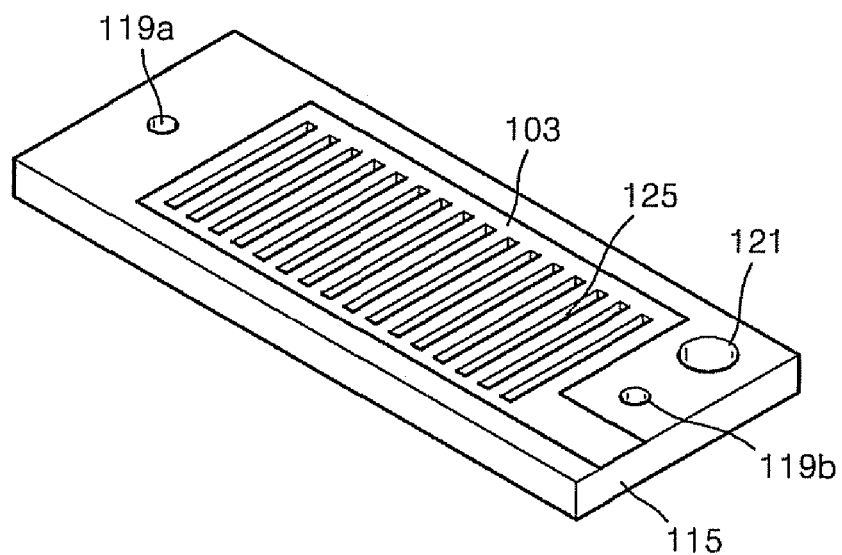
FIGS. 3A, 3B and 3C are respectively a perspective view, a cross-sectional view, and a plan view of an exemplary embodiment of an anode and an exemplary embodiment of an anode support part of the exemplary embodiment of a microfluidic device of FIG. 1.
Figure 3B:
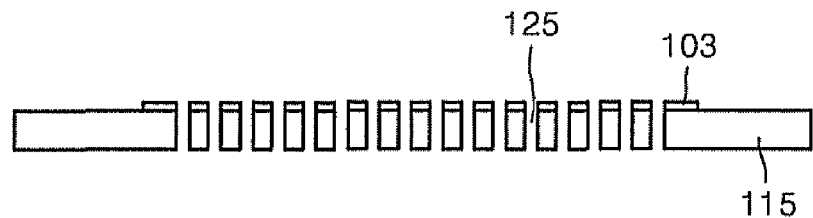
Figure 3C:
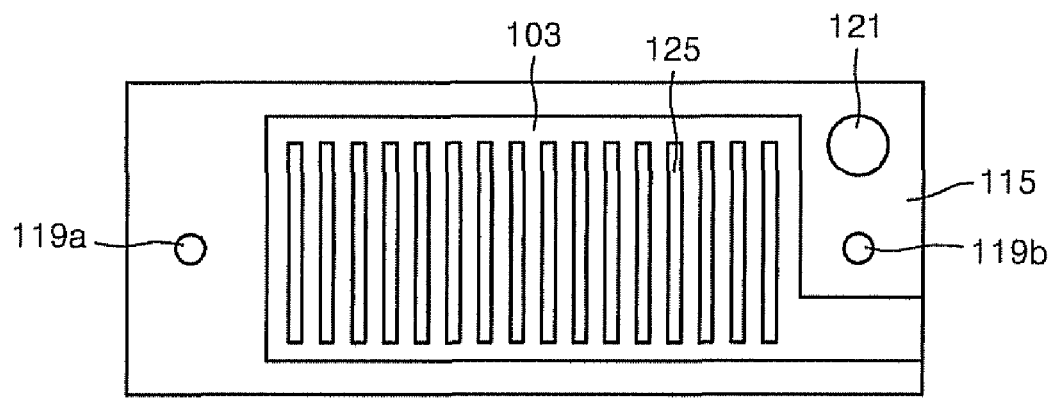

FIGS. 3A, 3B and 3C are respectively a perspective view, a cross-sectional view, and a plan view of an exemplary embodiment of the anode and an exemplary embodiment of the anode support part of the exemplary embodiment of a microfluidic device of FIG. 1.

Referring to FIGS. 3A through 3C, the ladder-shaped anode 103 is formed on a surface of the anode support part 115, and openings 125 are formed to conform to the shape of the ladder-shaped anode 103. The anode support part 115 may include an inlet 119a through which a fluid flows in and an outlet 119b through which a fluid flows out. Exemplary embodiments of the anode support part 115 may further include a power connection part 121 connecting the cathode 101 and a power source (not shown).

In exemplary embodiments of the microfluidic device according to the present invention, the length of the ladder-shaped anode 103, the width of the openings 125, the width of lateral unit electrodes between the openings 125, and various other physical characteristics, can be easily determined by one of ordinary skill in the art and are not limited to specific ranges or proportions.

Referring to FIGS. 1 and 2, the microfluidic device includes a pillar structure 117 formed on the cathode 101. The pillar structure 117 contacts and supports the ion exchange membrane 105. In one exemplary embodiment the pillar structure 117 can effectively adsorb biomolecules, such as cells.

Figure 4A:
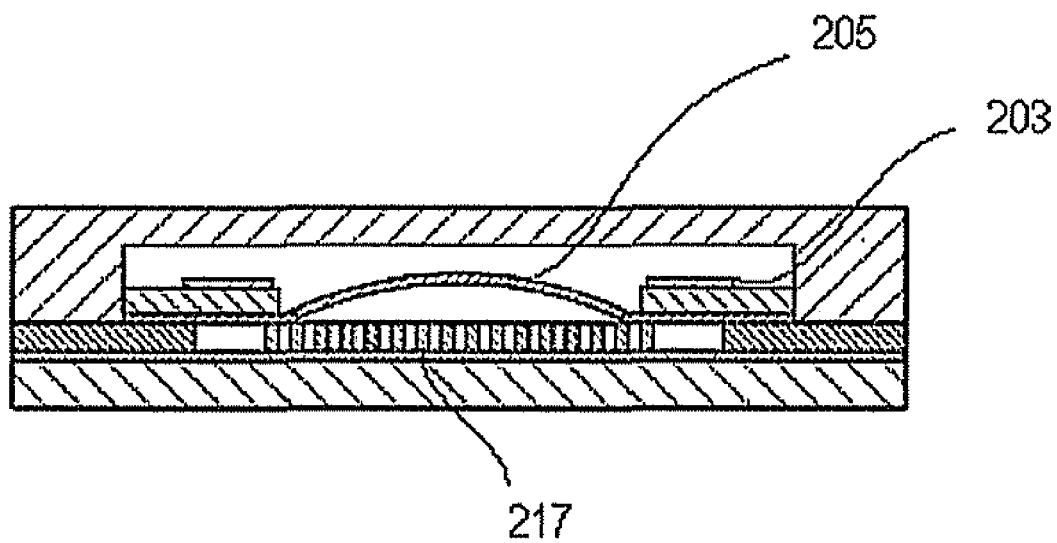
FIG. 4A is a cross-sectional view of a microfluidic device illustrating the swelling of an ion exchange membrane in a microfluidic device which does not include a ladder-shaped anode and an anode support part, but does include a cathode chamber which includes a pillar structure.
Figure 4B:
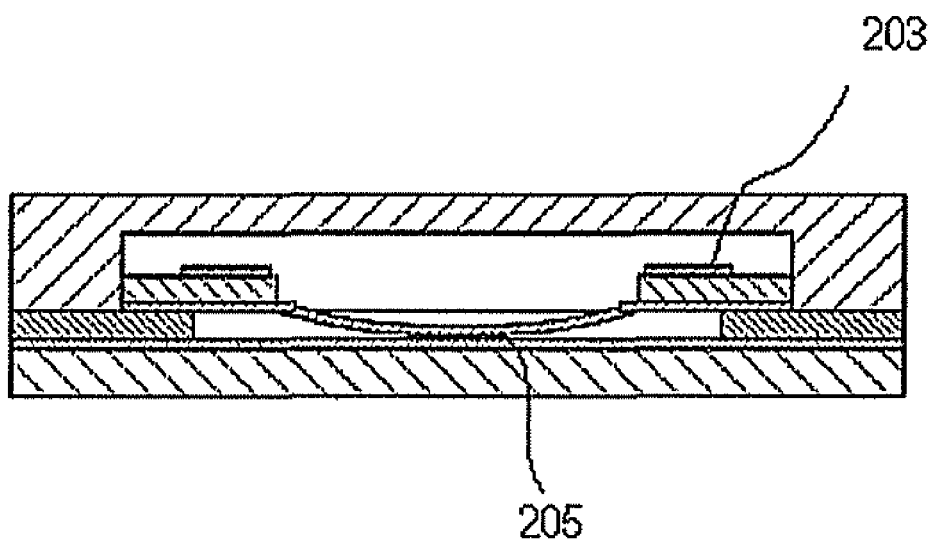
FIG. 4B is a cross-sectional view of a microfluidic device illustrating the swelling of an ion exchange membrane in a microfluidic device which does not include a ladder-shaped anode, an anode support part, or a pillar structure in a cathode chamber.

FIG. 4A is a cross-sectional view of a microfluidic device illustrating the swelling of the ion exchange membrane in a microfluidic device which does not include the ladder-shaped anode and the anode support part but does include a cathode chamber which includes a pillar structure, and FIG. 4B is a cross-sectional view of a microfluidic device illustrating the swelling of the ion exchange membrane in a microfluidic device which does not include the ladder-shaped anode, the anode support part, or the pillar structure.

Referring to FIG. 4A, when a microfluidic device includes a conventional anode 203 and a pillar structure 217 in the cathode chamber and does not include the ladder shaped anode support part, the ion exchange membrane 205 swells into the anode chamber. In this case, a fluid continuously flows over the pillar structure in which a drop in pressure is small, so that the pillar structure cannot effectively adsorb biomaterial, for example, cells.

Referring to FIG. 4B, when a microfluidic device includes a conventional anode 203 and does not includes a pillar structure in the cathode chamber and the anode support part, the ion exchange membrane 205 swells into the cathode chamber.

However, as described above, in the exemplary embodiment of a microfluidic device according to the present invention, the ion exchange membrane 105 is supported by the anode support part 115 and the pillar structure 117, so that the swelling of the ion exchange membrane 105 is reduced or effectively prevented, thereby minimizing a change in volume of either of the anode or cathode chambers.

In an exemplary embodiment of a microfluidic device according to the present invention, the anode support 115 may be formed of a printed circuit board ("PCB"), a silicon wafer, a glass material, a quartz material, a metal material, or a plastic material.

When a PCB is used as the anode support part 115, it is easy to process the PCB. In addition, the width of openings transmitting an electric current can be reduced, so that more lateral unit electrodes, seen as individual rungs of the ladder shape in a top plan view or as pillars in a cross-sectional view, can be formed. Thus, the resistance is reduced, pH can be uniformly regulated, and the effect of the pillar structure is maximized. In addition, when the microfluidic device is manufactured on a mass scale, the production costs may be minimized. For example, conventional methods of forming openings in a PCB cost about 100 times less than a method of forming comparable openings in a glass substrate using a sand blasting method.

In an exemplary embodiment of the present invention, each of the anode and cathode chambers may further include a gas outlet.

In an exemplary embodiment of the present invention, the cathode may be formed of a metal which adsorbs hydrogen gas, and the anode may be formed of a metal having a higher standard oxidization potential than, and which does not react with, water. In such an exemplary embodiment, generation of a gas is reduced or effectively prevented in both of the anode and cathode chambers. Thus, an additional gas outlet is not required for the anode and cathode chambers. In addition, the ion exchange membrane and the pillar structure can be disposed in close proximity.

Exemplary embodiments of the cathode are not limited to a certain metal, and can include any metal which can adsorb hydrogen gas.

In one exemplary embodiment the cathode can be formed of Pd. Pd is known to be capable of adsorbing a large amount of hydrogen (Bhadra Munasiri, et al., *J. Electroanal. Chem.*, pp 333-337, 1992). When the cathode is formed of Pd, Pd can prevent the generation of gas by adsorbing hydrogen gas generated near the cathode as a result of the electrolysis of water. Accordingly, Pd can increase the pH of a solution near the cathode since the H generated by the water is adsorbed but the $OH^-$ generated thereby is not.

Moreover, exemplary embodiments of the anode are not limited to a certain metal, and may be formed of any metal which has a higher standard oxidization potential than, and does not react with, water.

When electrolyzing water, oxygen gas generated at an anode forms bubbles, and the production of hydrogen ions lowers the pH of a solution. However, the exemplary embodiment of a microfluidic device according to the present invention using a metal having a higher standard oxidization potential than water does not generate gas, because, instead of the water being electrolyzed, the metal is oxidized. In addition, even if a small amount of oxygen is generated due to a rise in voltage, a change in solute, or other factors, it will form a metal oxide by combining with the metal, so that bubbles due to oxygen are not generated.

A metal which can react with water is not suitable for the anode of the microfluidic device, even if the metal has a higher standard oxidation potential than water. Examples of metals which are not suitable for the anode include K, Ca, Na, and Mg.

Furthermore, a metal which quickly forms an oxide film and increases resistance is not suitable for the anode, even through the metal has a higher standard oxidation potential than water. For example, Al, which quickly oxidizes into alumina, is not suitable for the anode.

Exemplary embodiments of the anode can be formed of a metal selected from the group consisting of Cu, Pb, Ag, Cr, Ti, Ni, Zn, Fe, and Sn.

The shape, structure, size, or other physical characteristics, of an exemplary embodiment of a microfluidic device according to the present invention are not limited to the specific shape and structure described herein, but may be modified by one of ordinary skill in the art.

According to the present invention, the ion exchange membrane transmits an electric current substantially reduces or effectively prevents the transmission of ions and gas generated as a result of electrolysis in the anode and cathode chambers therethrough.

Exemplary embodiments of the ion exchange membrane can be a cation exchange membrane or an anion exchange membrane.

In an exemplary embodiment of the present invention, the cation exchange membrane transmits cations but almost completely prevents the transmission of anions. On the other hand, the anion exchange membrane transmits anions but almost completely prevents the transmission of cations.

In one exemplary embodiment, the cation exchange membrane may be a strong acid exchange membrane including —$SO_3$— (such as Nafion™ available from Dupont) or a weak acid exchange membrane including —COO—. In another exemplary embodiment the anion exchange membrane may be a strong base exchange membrane including $N_+(CH_3)$ or a weak base exchange membrane including $N(CH_3)_2$. The cation and anion exchange membranes are well known to those of ordinary skill in the art, and can be easily purchased. For example, the ion exchange membranes may include Nafion™ from Dupont, Dowex™ from Aldrich, Diaion™ from Aldrich, or other materials which are available on the market.

In an exemplary embodiment of the present invention, each of the cathode and anode chambers may further include an inlet through which a fluid flows in and an outlet through which a fluid flows out.

In an exemplary embodiment of the present invention, each of the cathode and anode chambers may further include a micropump pumping a fluid in and out.

In an exemplary embodiment of a microfluidic device according to the present invention, a solution containing ions having a higher or lower standard oxidization potential than water, for example, an electrolyte, can be flowed into the anode chamber 109. Exemplary embodiments of ions having a lower standard oxidation potential than water can be at least one kind of anions selected from among $NO_3^-$, $F^-$, $SO_4^{2-}$, $PO_4^{3-}$ and $CO_3^{2-}$. In addition, exemplary embodiments of ions having a higher standard oxidation potential than water can be $Cl^-$. However, the present invention is not limited to the ions defined above.

When an anode chamber solution contains a compound having a lower standard oxidation potential than water, and electrolysis is performed using a microfluidic device according to an exemplary embodiment of the present invention, water is electrolyzed in the anode chamber and produces oxygen gas and $H^+$ ions. As a result, the pH of the anode chamber solution is lowered due to the $H^+$ ions. In addition, as described above, when the anode is formed of a metal which has a higher standard oxidation potential than, and does not react with, water, the metal is oxidized, and oxygen gas is not generated. In another exemplary embodiment $Cl^-$ ions, which have a higher standard oxidation potential than water, can be specially used for the purpose of cell lysis.

In another exemplary embodiment of a microfluidic device according to the present invention, a solution containing ions having a lower standard reduction potential than water can be flowed into the cathode chamber. Exemplary embodiments of ions having a lower standard reduction potential than water include cations, such as $Na^+$, $K^+$, $Ca^{2+}$, $Mg^{2+}$, and $Al^{3+}$, etc., but are not limited thereto. In this case, when electrolysis is performed using an exemplary embodiment of a microfluidic device according to the present invention, water is electrolyzed in the cathode chamber and generates hydrogen gas and $OH^-$ ions. As a result, the pH of the cathode chamber solution increases due to the $OH^-$ ions. In addition, as described above, when the cathode is formed of a metal which adsorbs hydrogen gas, the generated hydrogen gas is adsorbed by the cathode, and thus gas bubbles are not generated.

In the present invention, the anode chamber and the cathode chamber can additionally include an inlet through which a solution flows in and an outlet through which a solution flows out. It is not necessary that the inlet and the outlet are separately formed. Instead, a single port can be used as both the inlet and the outlet.

In an exemplary embodiment of the present invention, the cathode chamber and the anode chamber may further include a micropump pumping a fluid in and out.

An exemplary embodiment of a microfluidic device according to the present invention can be manufactured using any of several well known methods. For example, parts of the microfluidic device are manufactured, and then assembled into an exemplary embodiment of a microfluidic device.

Figure 5:
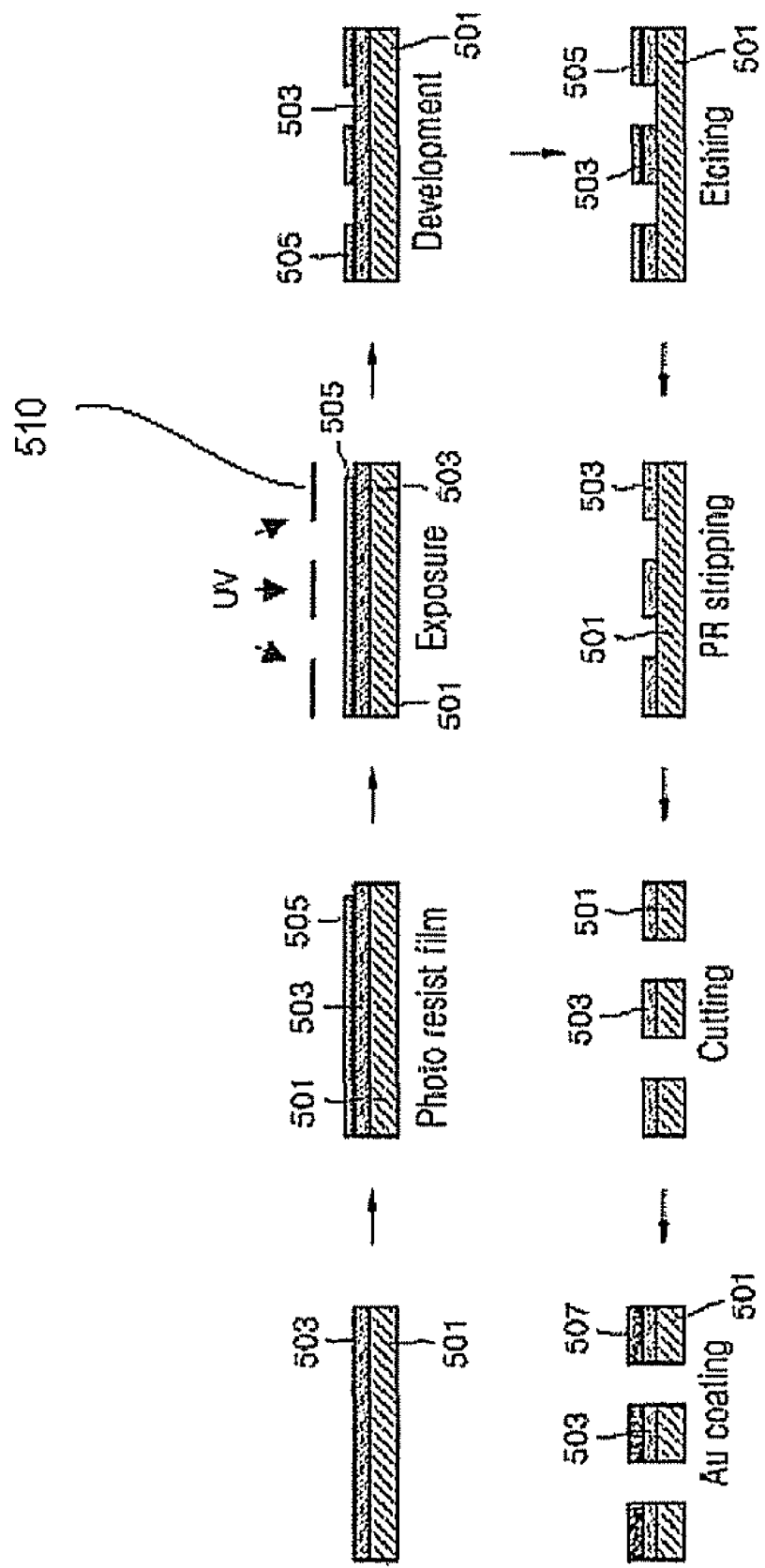
FIG. 5 illustrates an exemplary embodiment of a method of manufacturing an exemplary embodiment of an anode and an anode support part of a microfluidic device according to an embodiment of the present invention.

FIG. 5 illustrates an exemplary embodiment of a process of manufacturing an anode and an anode support part of an exemplary embodiment of a microfluidic device according to the present invention.

Referring to FIG. 5, a photoresist film 505 is deposited on a PCB 501 coated with a copper film 503. Next, the photoresist film 505 is exposed to UV light through a ladder-shaped mask 510 and developed. Next, a portion of the copper film 503 which has been left exposed by the developed photoresist film 505 is etched, and the photoresist film 505 is removed. Next, the exposed PCB 501 is cut to form openings, and gold 507 is coated on the remaining copper film 503, thereby manufacturing an anode and an anode support part of an exemplary embodiment of a microfluidic device according to the present invention.

Figure 6A:
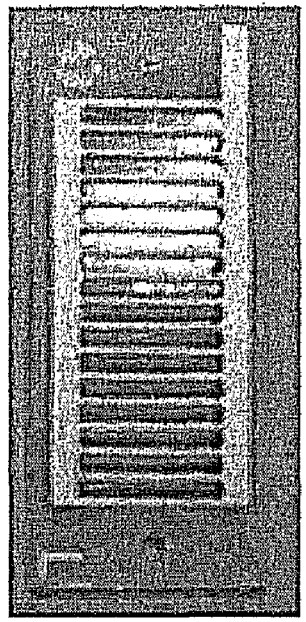
FIG. 6A is a photograph of an exemplary embodiment of an anode and an exemplary embodiment of an anode support part of an exemplary embodiment of a microfluidic device according to the present invention.
Figure 6B:
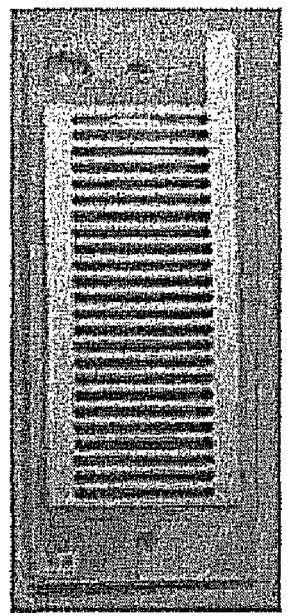
FIG. 6B is a photograph of an exemplary embodiment of an anode and an exemplary embodiment of an anode support part of an exemplary embodiment of a microfluidic device according to the present invention.

FIG. 6A is a photograph of an exemplary embodiment of an anode and an exemplary embodiment of an anode support part of an exemplary embodiment of a microfluidic device of the present invention. FIG. 6B is a photograph of another exemplary embodiment of an anode and an exemplary embodiment of an anode support part of an exemplary embodiment of a microfluidic device according to the present invention.

Figure 7:
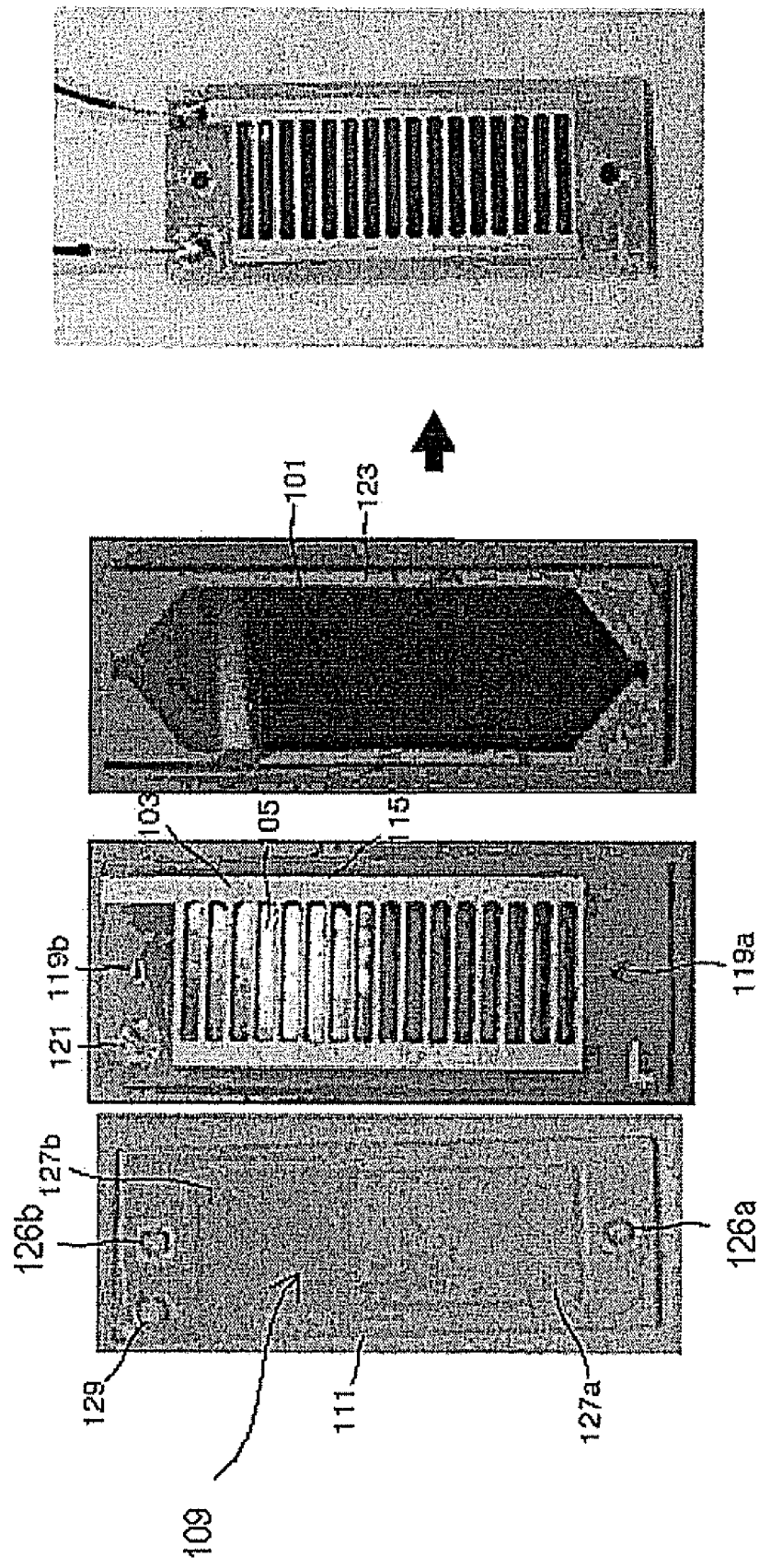
FIG. 7 show photographs of exemplary embodiments of parts of an exemplary embodiment of a microfluidic device according to the present invention and an exemplary embodiment of the microfluidic device assembled from the parts.

FIG. 7 shows photographs of exemplary embodiments of parts of an exemplary embodiment of a microfluidic device according to the present invention and an exemplary embodiment of the microfluidic device assembled from the parts.

Referring to FIG. 7, a pillar structure is not formed in the cathode chamber. An inlet 126a and an outlet 126b, which respectively match an inlet 119a and an outlet 119b of the anode support part 115, are formed in an anode chamber substrate 111. An additional pair of inlets and outlets, namely inlet 127a and an outlet 127b, are formed in the anode chamber 109. A power connection part 129, which matches a power connection part 121 on the anode support part 115, is formed in the anode chamber substrate 111.

An exemplary embodiment of a method of electrochemically regulating a pH of a fluid according to the present invention includes; a) flowing a solution containing ions having a higher or lower standard oxidization potential than water into an anode chamber; b) flowing a solution containing ions having a lower standard oxidization potential than water into a cathode chamber; and c) regulating a pH of each of the solutions which flows into the anode chamber and cathode chamber by inducing electrolysis in each of the anode and cathode chambers by applying an electric current between the anode and cathode.

In one exemplary embodiment of the pH regulating method according to the present invention, examples of anions having a lower standard oxidization potential than water, anions having a higher standard oxidization potential than water, and cations having a higher standard oxidization potential than water are substantially the same as those described above. Operations a) and b) above can be simultaneously or sequentially performed.

The pH can be regulated in several different ways, such as modifying the direction in which an electric current is applied, modifying the magnitude of the electric current, modifying the duration of the electric current application, modifying the width of electrodes, or modifying the thickness of the ion exchange membrane. The direction of an electric current, the magnitude of the electric current, the duration of the electric current application, the width of electrodes, and the thickness of the ion exchange membrane can be varied according to a target pH, the volume of the chamber, or other desired physical characteristics, and can be experimentally determined by one of ordinary skill in the art.

When a sample solution containing NaCl, which is contained in most bio-sample solutions, is flowed into the anode and cathode chambers and subjected to electrolysis, $Cl^-$ ions, not water, are electrolyzed in the anode chamber. As a result, chlorine gas and hydrogen ions are generated. The quantity of hydrogen ions generated in the anode chamber is less than the quantity of hydroxide ions generated in the cathode chamber. The hydrogen ions are generated as a result of the reaction between the chlorine gas and water, and the amount of hydrogen ions varies according to the condition in which the chlorine gas is dissolved. Thus, pH regulation is difficult. In the present invention, to solve this problem, a compound having a lower standard oxidation potential than water and a compound having a lower standard reduction potential than water are used in the anode chamber and the cathode chamber, respectively. However, in another exemplary embodiment, for the purpose of cell lysis, a sample solution containing NaCl can be flowed into the anode and cathode chambers and subjected to electrolysis to allow cell lysis in the cathode chamber.

In an exemplary embodiment of a pH regulating method according to the present invention, since a cathode chamber solution containing a compound having a lower standard reduction potential than water is contained in the cathode chamber, water can be electrolyzed into hydrogen gas and $OH^-$ ions. In addition, since an anode chamber solution containing a compound having a lower standard oxidation potential than water is contained in the anode, water is electrolyzed and generates oxygen gas and $H^+$ ions. In other words, the cathode chamber solution develops an alkaline pH, and the anode chamber solution develops an acidic pH.

As described above, when the anode is formed of a metal which has a higher standard oxidation potential than, and does not react with, water, and the cathode is formed of a metal which adsorbs hydrogen gas, gas generation in each of the anode and cathode chambers can be prevented.

Hereinafter, the present invention will be described in more detail with reference to the following examples. However, these exemplary embodiments are for illustrative purposes only and are not intended to limit the scope of the invention.

Example 1

Manufacture of a Microfluidic Device for pH Regulation According to the Present Invention A ladder-shaped anode and an anode support part were manufactured using the method illustrated in FIG. 5.

In particular, a photoresist film was deposited on a PCB coated with a copper film. Next, the photoresist film was exposed to UV light through a ladder-shaped mask and developed. Next, a portion of the copper film exposed through the mask was etched, and the photoresist film was removed. Next, the exposed PCB was cut to form openings, and gold was coated on the remaining copper film.

FIG. 6A is a photograph of anode and anode support part manufactured according to Example 1.

Referring to FIG. 6A, the anode support part has a width of 14 mm and a length of 34 mm. The width of openings is 1.0 mm, and the width of lateral unit electrodes is 0.5 mm. A cation membrane containing —$SO_3$—$Na^+$ is attached under the anode support part. An inlet and an outlet of the cathode chamber for flowing a solution in and out, respectively, and a power connection part are formed in the anode support part.

An exemplary embodiment of a microfluidic device according to the present invention was manufactured using the anode and the anode support part manufactured above.

FIG. 7 shows photographs of parts of a microfluidic device manufactured using the anode and the anode support part manufactured in the above example and a photograph of the microfluidic device as an end product.

The first photograph of FIG. 7 shows an anode chamber substrate 111. An inlet 126b and outlet 126a of the cathode chamber for flowing in and out a solution, respectively, and an inlet 127a and an outlet 127b of the anode chamber for flowing in and out a solution, respectively, and a power connection part 121 are formed in the anode chamber substrate, as described above.

The second photograph in FIG. 7 shows the anode and the anode support part manufactured above.

The third photograph in FIG. 7 shows a cathode 101 and a cathode substrate 123. A pillar structure is not formed in the cathode substrate. In this example the cathode 101 was formed of palladium, and the thickness of the cathode substrate 123, i.e., the height of the cathode chamber, was 100 μm.

The three parts were assembled, and conducting wires were connected to the cathode and anodes, thereby manufacturing an exemplary embodiment of the microfluidic device according to the present invention. Each of the cathode and anode chambers had a volume of 10 μL.

Example 2

Manufacture of a Microfluidic Device for pH Regulation According to the Present Invention A ladder-shaped anode and an anode support part were manufactured in the same manner as in Example 1, except that gold was coated on the anode, and the width of openings and the width of lateral unit electrodes were 0.5 mm.

FIG. 6B is a photograph of the anode and anode support part manufactured thereby.

An exemplary embodiment of a microfluidic device according to the present invention was manufactured using the anode and anode support part manufactured above in the same manner as in Example 1.

Comparative Example 1

Manufacture of a Microfluidic Device for pH Regulation

A ladder-shaped anode and an anode support part were manufacture in the same manner as in Example 1, except that a rectangular anode with an opening at the center was formed, an anode support part with an opening corresponding to the opening of the anode was formed, and gold was coated on the anode.

Figure 6C:
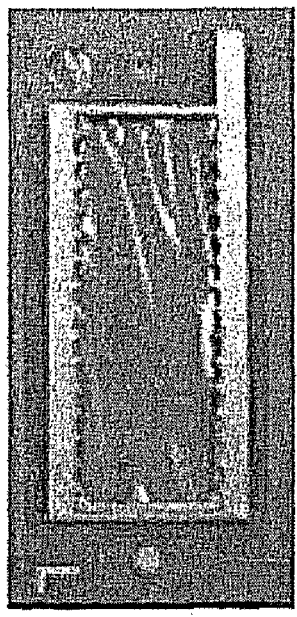
FIG. 6C is a photograph of an anode which does not have a ladder shape and an anode support part manufactured in Comparative Example 1.

FIG. 6C is a photograph of the anode and the anode support part manufactured in Comparative Example 1.

A microfluidic device was manufactured using the anode and anode support part manufactured above in the same manner as in Example 1.

Experimental Example 1

Confirmation of Swelling of Ion Exchange Membrane

Whether the ion exchange membrane of each of the microfluidic devices manufactures in Examples 1 and 2 and Comparative Example 1 swelled or not, and the degree of swelling were observed.

First, 10 μL of a 55 mM $Na_2SO_4$ solution was injected into each of the cathode and anode chambers of each of the microfluidic devices, and 1 minute later, observations were taken of the swelling of the ion exchange membrane.

Figure 8A:
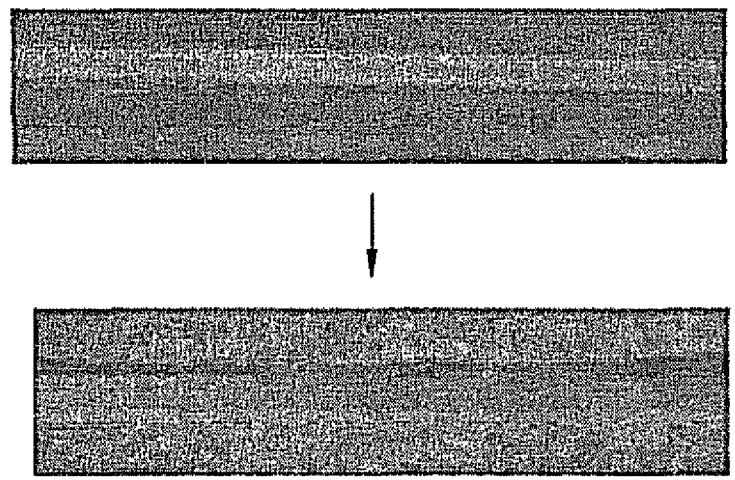
FIG. 8A shows photographs of an ion exchange membrane before and 1-minute after solution injection into the anode and cathode chambers of an exemplary embodiment of a microfluidic device of Example 1.
Figure 8B:
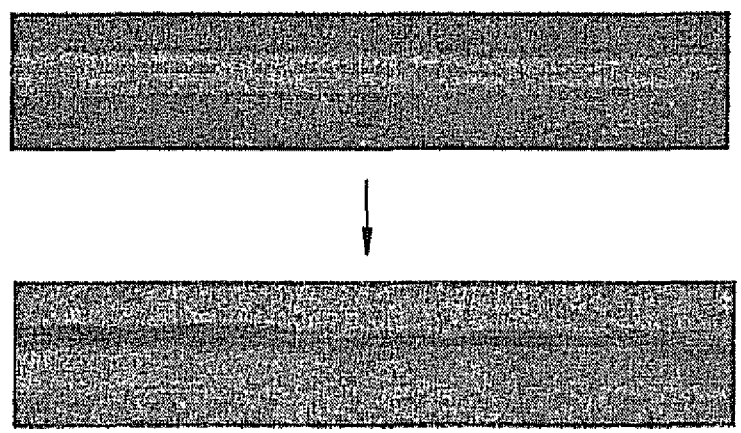
FIG. 8B shows photographs of an ion exchange membrane before and 1-minute after solution injection into the anode and cathode chambers of an exemplary embodiment of a microfluidic device of Example 2
Figure 8C:
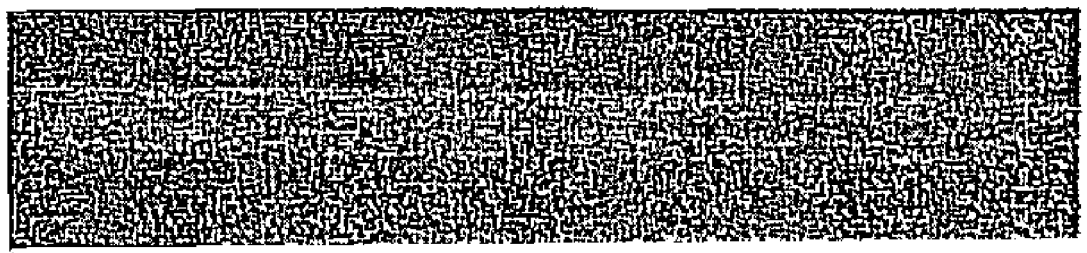
FIG. 8C shows photographs of an ion exchange membrane before and 1-minute after solution injection into the anode and cathode chambers of a microfluidic device of Comparative Example 1.
Figure 8C:
Figure 8C:
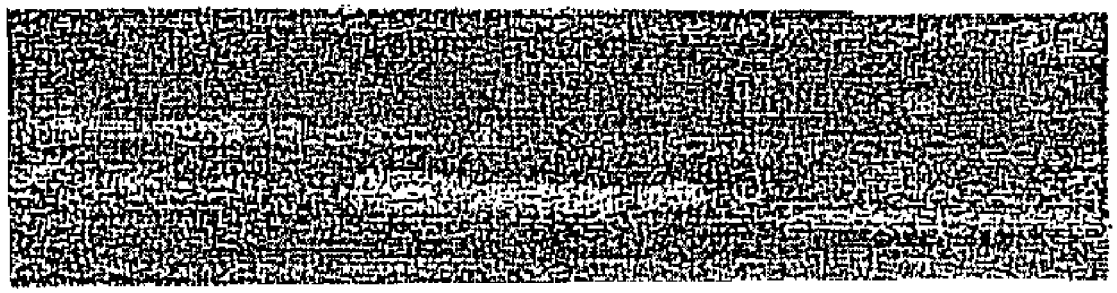

FIG. 8A shows photographs of the ion exchange membrane before and 1-minute after solution injection into the anode and cathode chambers of the exemplary embodiment of the microfluidic device of Example 1. FIG. 8B shows photographs of the ion exchange membrane before and 1-minute after solution injection into the anode and cathode chambers of the exemplary embodiment of a microfluidic device of Example 2. FIG. 8C shows photographs of ion exchange membrane before and 1-minute after solution injection into the anode and cathode chambers of the microfluidic device of Comparative Example 1.

Referring to FIGS. 8A through 8C, the least change in volume of the ion exchange membrane occurred in Example 1. The volume of the ion exchange membrane slightly changed in Example 2. However, the largest change in volume of the ion exchange membrane occurred in Comparative Example 1.

Experimental Example 2

Measurement of Resistance of a Microfluidic Device

First, 10 μL of a 55 mM $Na_2SO_4$ solution was injected into each of the cathode and anode chambers of the exemplary embodiments of microfluidic devices manufactured in Examples 1 and 2 and the microfluidic device of Comparative Example 1, and resistance between the cathode and anodes was measured.

As a result, the resistance of the exemplary embodiment of a microfluidic device according to Example 1 was about 750Ω, the resistance of the microfluidic device according to Example 2 was about 430Ω, and the resistance of the microfluidic device according to Comparative Example 1 was about 4500Ω. The area of the electrodes was a main factor affecting the resistance.

From the results above, it is apparent that the ladder-shaped anode of a microfluidic device according to the present invention reduces the resistance between electrodes and facilitates the flow of an electric current, thereby allowing efficient pH regulation.

Experimental Example 3

Conformation of Gas Generation in a Microfluidic Device

In this Experimental Example the generation of gas in each of the exemplary embodiments of microfluidic devices manufactured in Examples 1 and 2 after electrolysis was determined.

First, 10 μL of a 55 mM $Na_2SO_4$ solution were injected into each of the cathode and anode chambers of the exemplary embodiments of microfluidic devices manufactured in Examples 1 and 2, and a current of 2 mA was applied across the cathode and anodes.

Figure 9A:
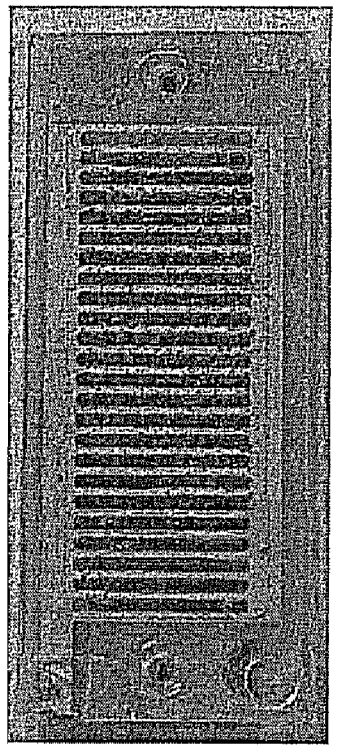
FIG. 9A is a photograph of an exemplary embodiment of the microfluidic device of Example 1 in which a gas was not generated in the anode after electrolysis, wherein a cathode was formed of palladium, and the anode was formed of lead.
Figure 9B:
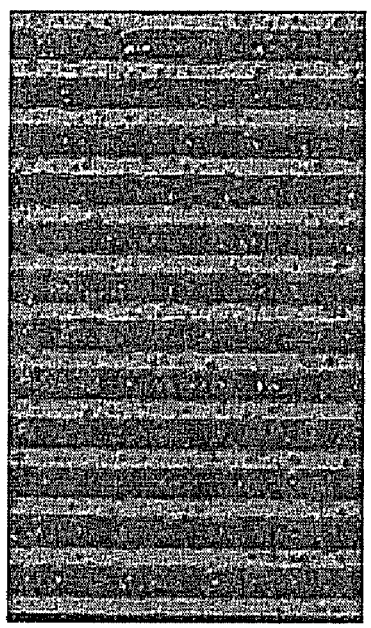
FIG. 9B is a photograph illustrating a magnified view of the exemplary embodiment of a microfluidic device of FIG. 9A.

FIG. 9A is a photograph of the exemplary embodiment of a microfluidic device of Example 1 in which a gas was not generated in the anode after electrolysis, wherein a cathode was formed of palladium, and the anode was formed of lead. FIG. 9B is a photograph illustrating a magnified view of the exemplary embodiment of a microfluidic device of FIG. 9A. As may be seen in FIGS. 9A and 9B no gas was generated in the anode chamber. Although not shown, the cathode chamber also generated no gas.

Figure 10A:
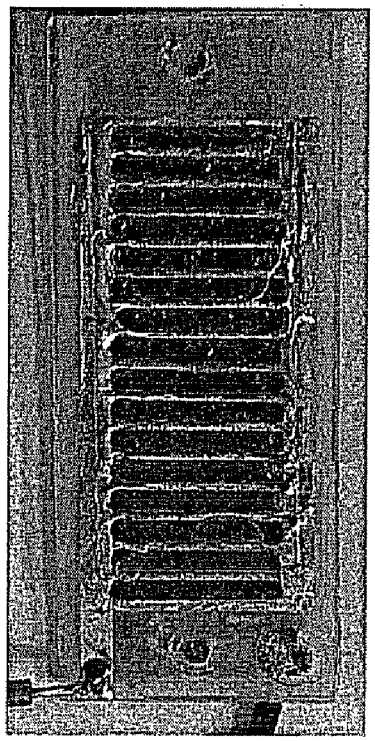
FIG. 10A is a photograph of the exemplary embodiment of a microfluidic device of Example 2 in which a gas was generated in the anode after electrolysis, wherein a cathode was formed of palladium, and the anode was formed of gold.
Figure 10B:
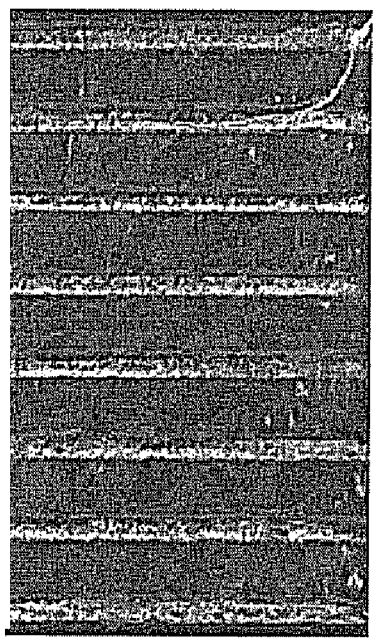
FIG. 10B is a photograph illustrating a magnified view of the exemplary embodiment of a microfluidic device of FIG. 10A.

FIG. 10A is a photograph of the exemplary embodiment of a microfluidic device of Example 2 in which a gas was generated in the anode after electrolysis, wherein a cathode was formed of palladium, and the anode was formed of gold. FIG. 10B is a photograph illustrating a magnified view of the exemplary embodiment of a microfluidic device of FIG. 10A. Although not shown, a gas was not generated in the cathode.

The results support that, when the cathode is formed of a metal which adsorbs hydrogen gas and the anode is formed of a metal which has a higher standard oxidization potential than, and does not react with, water, gas generation can be prevented during electrolysis.

As described above, in an exemplary embodiment of a microfluidic device according to the present invention, the swelling of the chamber separation membrane is prevented, and thus a change in volume of the chambers is minimized. As a result, a desired amount of sample can smoothly flow into the chambers. In addition, the anode is formed in a wide ladder-shape and facilitates the flow of an electric current, thereby allowing efficient pH regulation. In an exemplary embodiment of a pH regulating method according to the present invention, a pH of a fluid in the microfluidic device can be rapidly and easily regulated without swelling of the chamber separation membrane during electrolysis.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A microfluidic device which electrochemically regulates a pH of a fluid, the device comprising:
   an ion exchange membrane;
   an anode chamber, one side of which contacts a surface of the ion exchange membrane, wherein the anode chamber further comprises a ladder-shaped anode and an anode support part; and
   a cathode chamber, one side of which contacts a surface of the ion exchange membrane opposite the anode chamber, wherein the cathode chamber further comprises a cathode,
   wherein the ladder-shaped anode is formed on a first surface of the anode support part, openings are formed in the anode support part which conform to the shape of the ladder-shaped anode, and a second surface of the anode support part, which opposes the first surface of the anode support part, contacts and supports the ion exchange membrane.

2. The microfluidic device of claim 1, wherein the anode support part is formed of a printed circuit board.

3. The microfluidic device of claim 1, further comprising a pillar structure on the cathode, wherein the pillar structure contacts and supports the ion exchange membrane.

4. The microfluidic device of claim 1, wherein each of the anode and cathode chambers further comprises a gas outlet.

5. The microfluidic device of claim 1, wherein the cathode is formed of a metal which adsorbs hydrogen gas, and the anode is formed of a metal which has a higher standard oxidization potential than, and does not react with, water.

6. The microfluidic device of claim 5, wherein the cathode is formed of palladium.

7. The microfluidic device of claim 5, wherein the anode is formed of a material selected from the group consisting of copper (Cu), lead (Pb), silver (Ag), chromium (Cr), titanium (Ti), nickel (Ni), zinc (Zn), iron (Fe) and tin (Sn).

8. The microfluidic device of claim 1, wherein the ion exchange membrane transmits an electric current and substantially prevents the transmission of ions and gas therethrough.

9. The microfluidic device of claim 1, wherein each of the cathode and anode chambers further comprises a fluid inlet and a fluid outlet.

10. The microfluidic device of claim 1, wherein each of the cathode and anode chambers further comprises a micropump.

11. A method of electrochemically regulating a pH of a fluid in a microfluidic device comprising; an ion exchange membrane, an anode chamber, one side of which contacts a surface of the ion exchange membrane, wherein the anode chamber further comprises a ladder-shaped anode and an anode support part, a cathode chamber, one side of which contacts a surface of the ion exchange membrane opposite the anode chamber, wherein the cathode chamber further comprises a cathode, wherein the ladder-shaped anode is formed on a first surface of the anode support part, openings are formed in the anode support part which conform to the shape of the ladder-shaped anode, and a second surface of the anode support part, which opposes the first surface of the anode support part, contacts and supports the ion exchange membrane, the method comprising:

flowing a solution containing ions which have a higher or lower standard oxidization potential than water into the anode chamber;

flowing a solution containing ions which have a lower standard reduction potential than water into the cathode chamber; and inducing electrolysis in each of the anode and cathode chambers by applying an electric current between the anode and cathode.

12. The method of claim 11, wherein the ions which have a lower standard oxidization potential than water are at least one selected from the group consisting of $NO_3^-$, $F^-$, $SO_4^{2-}$, $PO_4^{3-}$ and $CO_3^{2-}$.

13. The method of claim 11, wherein the ions which have a higher standard oxidization potential than water are $Cl^-$.

14. The method of claim 11, wherein the ions which have a lower standard reduction potential than water are at least one selected from the group consisting of $Na^+$, $K^+$, $Ca^{2+}$, $Mg^{2+}$, and $Al^{3+}$.

15. The method of claim 11, wherein the pH is regulated according to the direction in which an electric current is applied.

16. The method of claim 11, wherein the pH is regulated according to the magnitude of the electric current.

17. The method of claim 11, wherein the pH is regulated according to the duration of the application of the electric current.

18. The method of claim 11, wherein the pH is regulated according to the width of at least one of the anode and the cathode.

19. The method of claim 11, wherein the pH is regulated according to the thickness of the ion exchange membrane.

* * * * *